US008508340B2

(12) United States Patent
Sanchez Sanchez et al.

(10) Patent No.: US 8,508,340 B2
(45) Date of Patent: Aug. 13, 2013

(54) DISTINCTIVE USER IDENTIFICATION AND AUTHENTICATION FOR MULTIPLE USER ACCESS TO DISPLAY DEVICES

(75) Inventors: David Sanchez Sanchez, Aachen (DE); Heribert Baldus, Aachen (DE); Karin Klabunde, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1678 days.

(21) Appl. No.: 11/718,992

(22) PCT Filed: Nov. 4, 2005

(86) PCT No.: PCT/IB2005/053615
§ 371 (c)(1),
(2), (4) Date: May 10, 2007

(87) PCT Pub. No.: WO2006/051462
PCT Pub. Date: May 18, 2006

(65) Prior Publication Data
US 2009/0058598 A1 Mar. 5, 2009

Related U.S. Application Data
(60) Provisional application No. 60/627,358, filed on Nov. 12, 2004.

(51) Int. Cl.
*G05B 19/00* (2006.01)
*G06F 7/00* (2006.01)
*G06T 1/00* (2006.01)
*H04B 1/00* (2006.01)

(52) U.S. Cl.
USPC .......... 340/5.83; 340/5.53; 382/124; 382/116

(58) Field of Classification Search
USPC ....... 340/5.83, 5.53; 382/124, 116; 345/173, 345/175, 104, 76; 356/71; 250/224, 221; 455/556.1; 726/19; 349/58
See application file for complete search history.

(56) References Cited

U.S. PATENT DOCUMENTS

| 5,140,642 | A | | 8/1992 | Hsu et al. |
| 5,392,367 | A | | 2/1995 | Hsu et al. |
| 5,420,936 | A | * | 5/1995 | Fitzpatrick et al. ........... 382/124 |
| 5,448,649 | A | * | 9/1995 | Chen et al. ..................... 382/126 |
| 5,456,256 | A | * | 10/1995 | Schneider et al. ............ 600/445 |

(Continued)

FOREIGN PATENT DOCUMENTS
DE 3823251 A1 1/1989
EP 0593386 A2 4/1994

OTHER PUBLICATIONS

Maltoni, D., et al.; Handbook of Fingerprint Recognition; Springer Verlag; 2003; pp. 59-64.
Compu-Data Electronics, Inc. "About Touchscreen/CRT Monitors" http://www.compudata.ca/ctmonitorsmore.html Oct. 11, 2004.
"Sound"; "Sound Propagation/Interaction with Target"; "Sound Detection/Image Formation"; "Applications and Techniques"; "Image Features"; http://www.bme.vanderbilt.edu/bme258/ultrasound/ Oct. 11, 2004.

(Continued)

Primary Examiner — Nam V Nguyen

(57) ABSTRACT

A user interface (20, 20', 20", 20"') for providing authenticated access to medical equipment, data, or records includes a dynamic display (30, 30"') that selectively shows user options. A touchscreen overlay (40) aligned with the dynamic display identifies a touch location on, in, or adjacent the dynamic display. A fingerprint reader (50, 50', 50", 50"') is triggered by the touchscreen overlay and acquires a fingerprint at the touch location. User authentication, access control and logging are performed based on identifying and authenticating the fingerprint.

18 Claims, 7 Drawing Sheets

(56) References Cited

U.S. PATENT DOCUMENTS

| | | | |
|---|---|---|---|
| 5,625,448 A * | 4/1997 | Ranalli et al. | 356/71 |
| 5,818,956 A * | 10/1998 | Tuli | 382/126 |
| 6,182,892 B1 * | 2/2001 | Angelo et al. | 235/380 |
| 6,327,376 B1 | 12/2001 | Harkin | |
| 6,454,414 B1 * | 9/2002 | Ting | 353/28 |
| 6,671,563 B1 | 12/2003 | Engelson et al. | |
| 6,785,408 B1 * | 8/2004 | Setlak et al. | 382/125 |
| 6,879,710 B1 * | 4/2005 | Hinoue et al. | 382/124 |
| 6,960,788 B2 * | 11/2005 | Joo et al. | 257/59 |
| 7,030,860 B1 * | 4/2006 | Hsu et al. | 345/173 |
| 7,034,866 B1 * | 4/2006 | Colmenarez et al. | 348/211.12 |
| 7,194,113 B2 * | 3/2007 | Greschitz et al. | 382/115 |
| 7,239,728 B1 * | 7/2007 | Choi et al. | 382/124 |
| 7,751,600 B2 * | 7/2010 | Yamazaki et al. | 382/124 |
| 2002/0035484 A1 | 3/2002 | McCormick | |
| 2002/0036619 A1 | 3/2002 | Simmon et al. | |
| 2002/0133499 A1 | 9/2002 | Ward et al. | |
| 2003/0173408 A1 | 9/2003 | Mosher et al. | |
| 2003/0191764 A1 | 10/2003 | Richards | |
| 2004/0073432 A1 | 4/2004 | Stone | |
| 2004/0078605 A1 | 4/2004 | Gruber et al. | |
| 2004/0252867 A1 * | 12/2004 | Lan et al. | 382/124 |

OTHER PUBLICATIONS

"Medical Imaging with Ultrasound" http://www.qub.ac.uk/edu/niesu/physics/medical/usfolder/usprint.html Oct. 11, 2004.

Bicz, "What the Future of the Automatic Teller Machine May Look Like" http://www.optel.com.pl/article/English/terminal.htm Oct. 11, 2004.

Bicz, et al. "Ultrasonic Setup for Fingerprint Pat Detection and Evaluation" http://www.optel.com.pl/article/English/article2.htm Oct. 11, 2004.

STARTEK Engineering, Inc. FSC100 http://www.startek.com.tw/EN/products/FSC100.htm Oct. 11, 2004.

Allproducts.com, Fingerprint Verifier (FC-100) Startek Engineering, Inc. http://www.allproducts.com.tw/manufacture2/startek/fc-100.html Oct. 11, 2004.

"A Few Scanning Tips" http://www.scantips.com/chap3c.html Oct. 11, 2004.

Epson, "EPSON Perfection 3200 Photo Color Scanner USB 2.0/Firewire" http://www.digitaletc.com/.go/item/9631 Oct. 11, 2004.

\* cited by examiner

DISTINCTIVE USER IDENTIFICATION AND AUTHENTICATION FOR MULTIPLE USER ACCESS TO DISPLAY DEVICES

CROSS REFERENCE TO RELATED APPLICATIONS

This application claims the benefit of U.S. provisional application Ser. No. 60/627,358 filed Nov. 12, 2004, which is incorporated herein by reference.

The following relates to the medical arts. It finds particular application in providing security and controlled access to medical equipment operated by a touchscreen display, and will be described with particular reference thereto. More generally, it finds application in providing security and access control for medical therapy equipment, medical monitoring equipment, medical data storage systems, medical records systems, and so forth. Still further, it finds application in providing security and access control to electronic devices with touchscreen display generally.

Medical equipment, data, and records present critical security issues requiring strict controls on, during and after access. First, users seeking access to medical equipment employed in monitoring or treating a patient must be uniquely identified and authenticated. Second, medical equipment employed in monitoring or treating a patient should only be operated by qualified and authorized medical personnel. Finally, medical devices must implement audit control mechanisms, so that it is possible to examine activity in devices and the user responsible for it. However, many medical devices provide no access control whatsoever. For example, the ubiquitous intravenous fluid flow controller used to control delivery of intravenous fluid to a patient typically has no access control, even though the patient's room may be accessible to the patient's family and friends, hospital orderlies, and others with no medical qualifications.

To restrict access, some medical equipment requires a log in procedure prior to use. This approach provides some security; however, if the user leaves the device unattended while logged on, then anyone can access the equipment. Also, the medical procedure employing the medical device may be performed by a team of medical personnel not all of whom are qualified to operate the medical device. In a variation on this problem, some team members may be authorized to perform certain functions using the equipment, but not other functions. Nonetheless, once any authorized user logs on, all members of the team have access to the medical device with the same access rights granted to the logged user. Additionally, user operations on the medical device may be associated to the user not directly responsible for them. Still further, it may be undesirable in some critical care settings to require a doctor or other authorized medical person to perform a tedious log in procedure prior to using the equipment. For example, one does not want an emergency room doctor to have to log in prior to applying a defibrillator to a patient in complete coronary arrest.

Another approach for restricting access to medical equipment is the use of personal identification devices, such as trusted pocket identifiers, which are carried on the person of the authorized medical person. The identifier wirelessly connects with the medical device when carried into radio range and authenticates access to medical equipment. This approach can be advantageous in critical care situations, since no tedious manual log in procedure is involved. However, the identifier does not allow discrimination between multiple persons near the medical device; indeed, the presence of any authorized person in radio range of the medical device makes the device accessible to everyone in the vicinity, regardless of whether or not they are actually authorized to use the device.

Similar access concerns arise regarding medical data and records. Patient records are confidential; accordingly, access to these records should be restricted to authorized hospital personnel. Merely requiring a user to log into an access terminal of the records database is problematic, since the person may inadvertently leave the terminal without logging out. A programmed time out on the login session can reduce but does not eliminate this concern. Moreover, it may be impossible to carry out a tedious login procedure in critical care situations. For example, an emergency room doctor should not have to perform a tedious log in procedure in order to access patient information such the patient's reported symptoms, patient blood type, and so forth, that is critical in making a rapid diagnosis and providing immediate treatment.

These problems are enhanced when using a touchscreen display to operate medical equipment, since it is difficult to implement an effective user-friendly way of authenticating an accessing user without disturbing his or her medical practice. Due to the open nature of touchscreen displays, distinctive authentication of users accessing the medical device turns is especially challenging in team settings in which many clinicians gather around the medical device and have access to the same session at substantially the same time.

The following contemplates improved apparatuses and methods that overcome the aforementioned limitations and others.

According to one aspect, a user interface is disclosed for providing user identification and authentication of users accessing medical equipment, data, or records. A dynamic display selectively shows user options. A touchscreen overlay aligned with the dynamic display identifies a touch location on, in, or adjacent the dynamic display. A fingerprint reader is triggered by the touchscreen overlay and acquires a user fingerprint at the touch location. The fingerprint is then securely associated to a unique user identifier.

According to another aspect, a user interfacing method is provided for user identification and authentication of users accessing medical equipment, data, or records. User options are selectively shown on a dynamic display. A touch location is identified on, in, or adjacent the dynamic display. Responsive to the identifying of a touch location, a fingerprint is acquired at the touch location. The fingerprint is then securely associated to a unique user identifier.

According to yet another aspect, a user interface is disclosed for providing user identification and authentication of users accessing of an electronic device. A dynamic display selectively shows user options. A touchscreen overlay aligned with the dynamic display identifies a touch location on, in, or adjacent, the dynamic display. A fingerprint reader is triggered by the touchscreen overlay and acquires a fingerprint at the touch location. The fingerprint is then securely associated to a unique user identifier.

One advantage resides in providing unique user identification and authentication of users accessing to medical equipment, data, or records without requiring a tedious and time-consuming manual login process.

Another advantage resides in authenticating a user for each and every access to an item of medical equipment, a medical records terminal, or the like.

Another advantage resides in providing distinctive user identification, so that each user of a group of users having simultaneous access to medical equipment, data, or records can be distinguished uniquely.

Another advantage resides in acquiring a fingerprint automatically from anywhere on a touchscreen display.

Another advantage resides in providing user identity-based access to medical equipment, data, or records without requiring a tedious and time-consuming manual login process.

Another advantage resides in logging the user identity in each and every access to an item of medical equipment, data, or records, or the like.

Yet another advantage resides in providing individualized and optionally differentiated authenticated access to a plurality of functions of a user interface display.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

FIG. 1 diagrammatically shows a typical medical environment employing an authenticated user interface for access to medical equipment.

Figure 8:
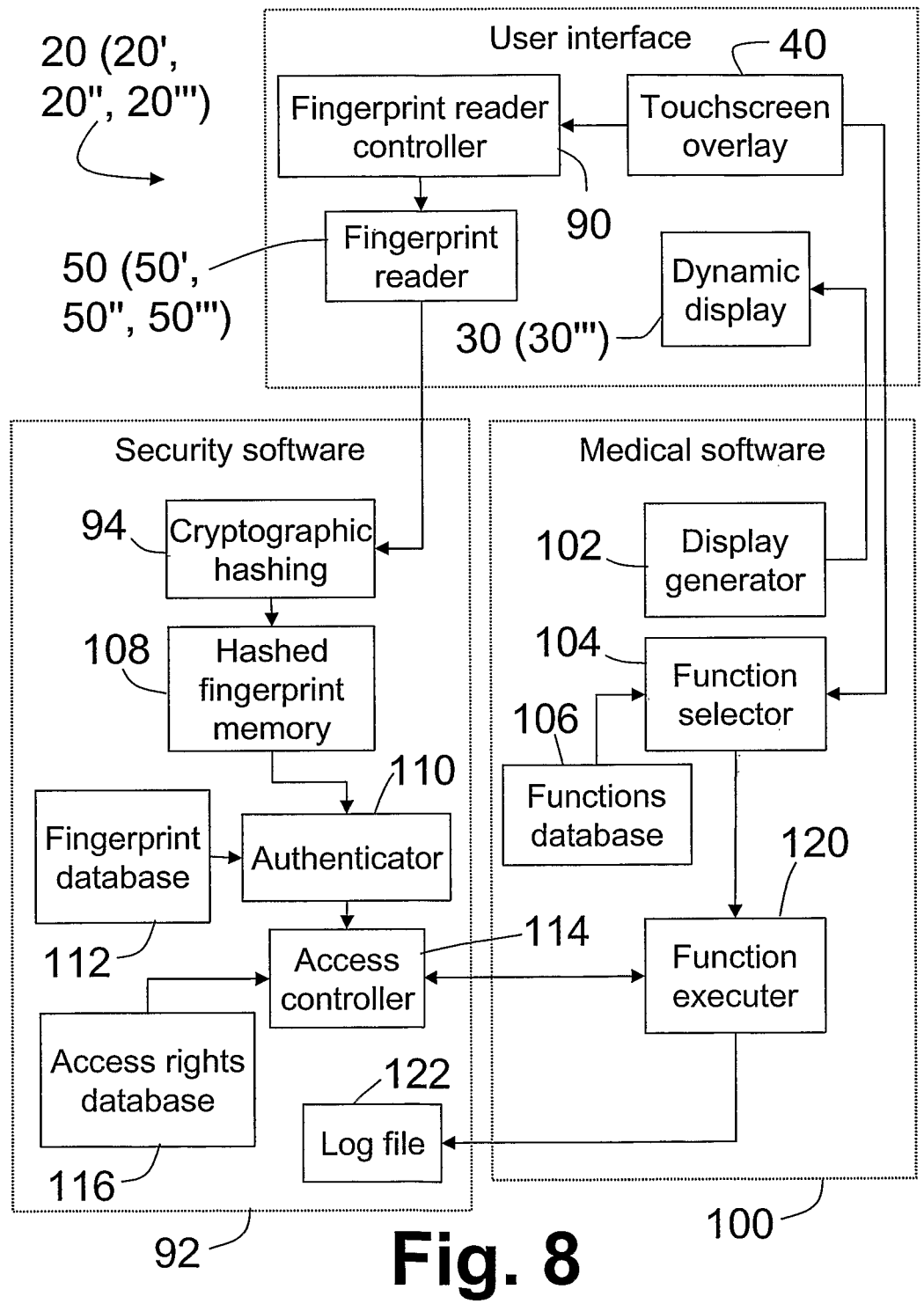

FIG. 8 diagrammatically shows system components of a medical system employing one of the user interfaces of FIGS. 2A, 2B and 2C, FIGS. 3A and 3B, FIG. 4, or FIGS. 6A and 6B.

Figure 1:
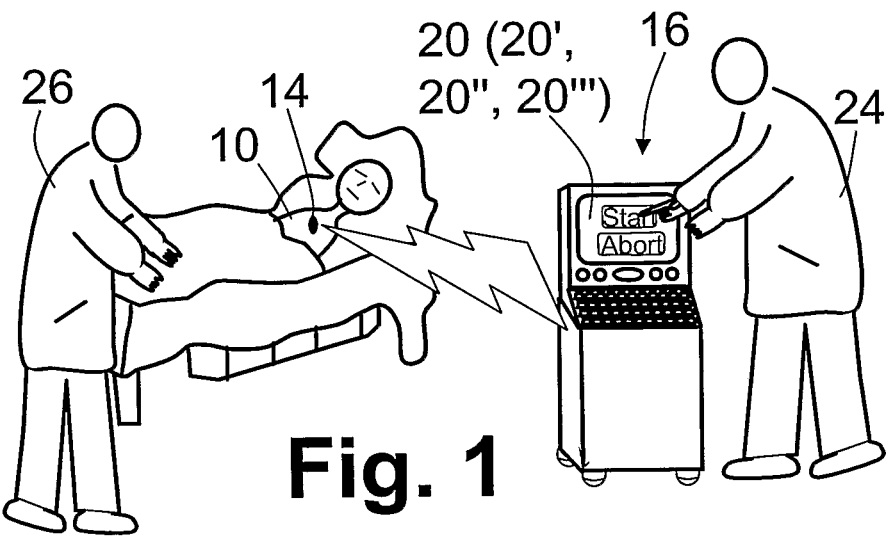

With reference to FIG. 1, a medical patient 10 receives medical treatment, such as monitoring of vital signs, delivery of an intravenous fluid, or so forth, using a medical probe 14 that is wirelessly coupled with a medical system 16. In other embodiments, the wireless coupling is replaced by a coupling cable. The medical system 16 includes a user interface 20 with dynamic display and touchscreen input capabilities for interfacing with an authorized medical person 24, who may for example be a medical doctor. Unauthorized persons, such as an orderly 26 also in the vicinity, are prevented from executing commands by a fingerprint authentication component of the user interface 20.

Figures 2A, 2B, 2C:
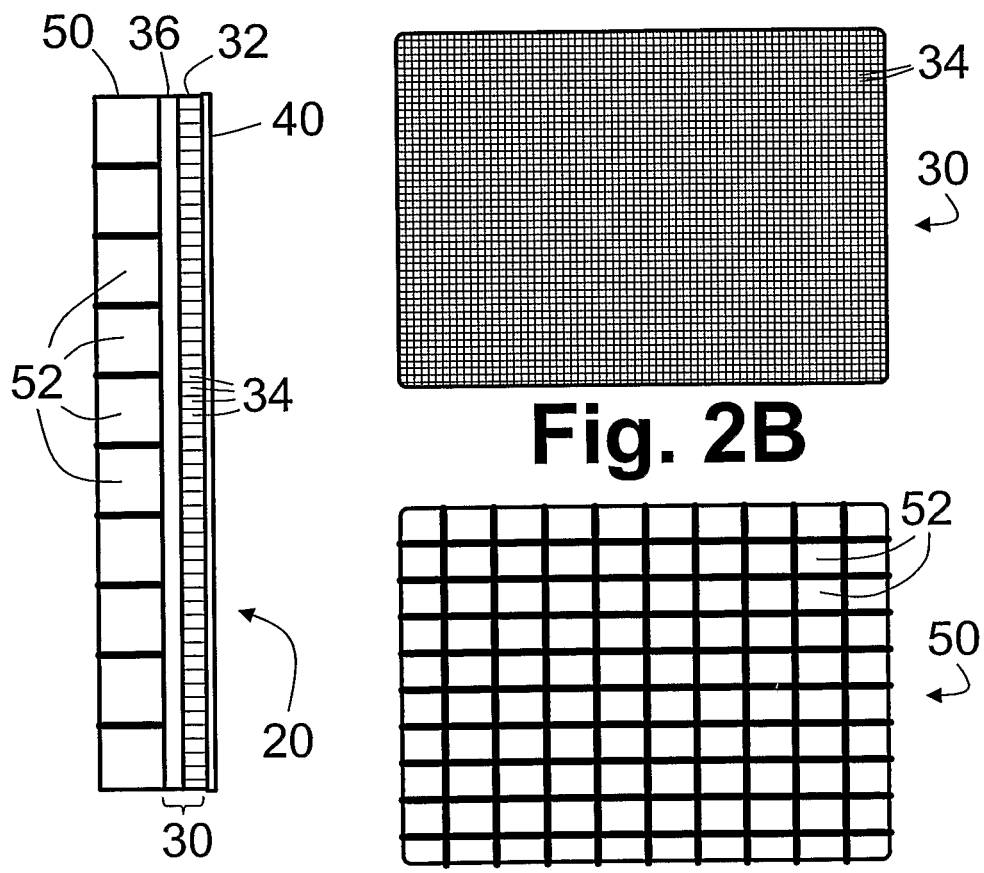
FIG. 2A shows a diagrammatic side view of a user interface including a dynamic display, touchscreen overlay, and grid of fingerprint scanners.
FIG. 2B shows a front view of the user interface of FIG. 2A.
FIG. 2C shows a front view of the user interface of FIG. 2A with the dynamic display removed to reveal the grid of fingerprint scanners.

With reference to FIGS. 2A, 2B, and 2C, the user interface 20 includes a dynamic display 30, which in the illustrated embodiment includes a light-transmissive liquid crystal display (LCD) 32 divided into pixels 34 and a backlight 36. The opacity of the LCD pixels 34 is selectively controlled to control the light output. For color displays, the pixels 34 include color filters arranged to define RGB color pixel cells. The pixels 34 are drawn diagrammatically; in a typical dynamic display, the pixels are smaller than illustrated so as to provide a high resolution display. The illustrated LCD display 32 is an example; in other embodiments, the dynamic display is a plasma display or other thin-screen display.

To provide touchscreen input capability, the user interface 20 further includes a touchscreen overlay 40 employing an analog resistive technology, a capacitive technology, a surface acoustical wave (SAW) technology, or the like to provide an electrical signal indicative of a location of a finger touching the user interface 20. The touchscreen overlay 40 is substantially light transmissive to allow the underlying dynamic display 30 to be viewed through the touchscreen overlay 40. In some embodiments, the touchscreen overlay may be integrated with the dynamic display 30. For example, the LCD 32 typically includes front and back glass or plastic substrates, and the touchscreen overlay 40 can include a touch-sensitive overlay disposed on the front glass or plastic substrate.

To provide user identification and authentication, the user interface 20 still further includes a fingerprint reader 50 disposed behind the dynamic display 30. The fingerprint reader 50 of FIGS. 2A and 2C includes an array of fingerprint scanners 52 arranged in a two-dimensional array substantially spanning the area of the dynamic display 30. Each individual fingerprint scanner 52 typically spans a plurality of the LCD pixels 34. When the authorized medical person 24 touches the touchscreen overlay 40, the location of the touch is determined and the corresponding underlying one of the fingerprint scanners 52 acquires the fingerprint of the finger used to make the touch. In some cases in which the touch location is near a boundary between two fingerprint scanners 52, both fingerprint scanners may optionally be used, each acquiring a portion of the fingerprint. In some cases in which the touch location is near a corner where four fingerprint scanners 52 meet, all four fingerprint scanners may optionally be used, each acquiring a portion of the fingerprint.

Figure 3A:
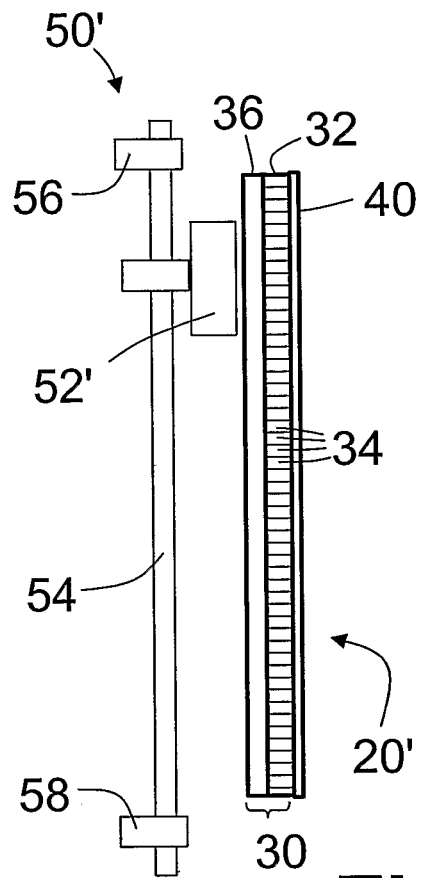
FIG. 3A shows a diagrammatic side view of a user interface including a dynamic display, touchscreen overlay, and mechanically translatable fingerprint scanner.
Figure 3B:
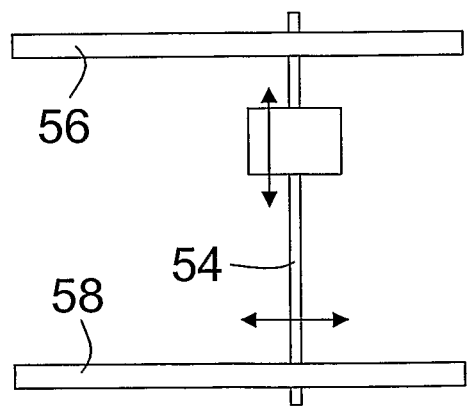
FIG. 3B shows a front view of the user interface of FIG. 3A with the dynamic display removed to reveal the mechanically translatable fingerprint scanner.

With reference to FIGS. 3A and 3B, in another user interface 20' the fingerprint reader 50 is replaced by a fingerprint reader 50' that includes a single fingerprint scanner 52', which may be for example an ultrasound transducer head. The fingerprint scanner 52' is mechanically translatable in a vertical direction along a shaft 54, and the shaft 54 is in turn mechanically translatable in a horizontal direction along transverse support shafts 56, 58. Thus, the fingerprint scanner 52' can be moved vertically and horizontally to be positioned under a touch position substantially anywhere on the face of the dynamic display 30. The illustrated mechanical translation device 54, 56, 58 is an example, and can be replaced by substantially any mechanical translation device that can move the scanner to the touch location rapidly.

Figure 4:
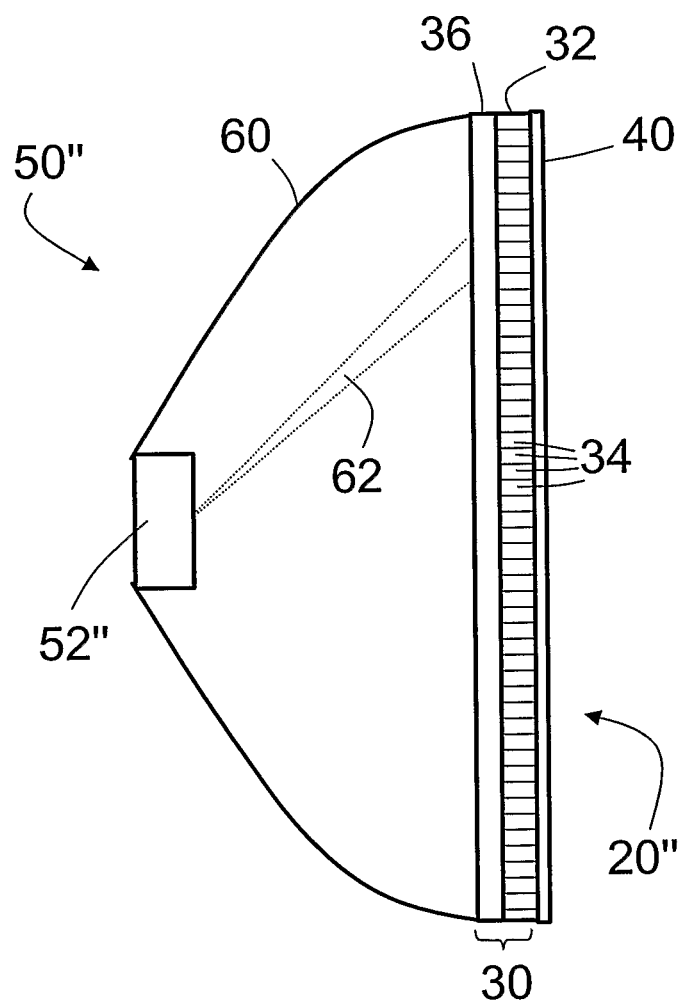
FIG. 4 shows a diagrammatic side view of a user interface including a dynamic display, touchscreen overlay, and an electronically steerable fingerprint scanner.

With reference to FIG. 4, in yet another user interface 20" the fingerprint reader 50 is replaced by a fingerprint reader 50" that includes a single fingerprint scanner 52" having an electrically steerable ultrasound transducer head. The fingerprint scanner 52" is mounted in a fixed position behind the dynamic display 30 in a fingerprint reader housing 60, and employs selected phase settings in the emission and reception of an ultrasonic probe beam 62 to electrically steer the probe beam 62 to the touch location on the dynamic display 30. Alternatively, the fingerprint scanner 52" is a directional scanner mounted in a fixed position in the housing 60 on a gimbal mount that allows the probe beam 62 to be mechanically pointed at the touch location.

The fingerprint readers 50, 50', 50" read fingerprints through the dynamic display 30. Typically, an ultrasonic probe beam readily passes through the dynamic display 30 to read the fingerprint of the finger pressing at the touch location on the touchscreen overlay 40. Accordingly, the dynamic display 30 can display a selection button image or other intuitive image in a selection button region that the authorized medical person 24 sees as indicating the area of the display in which he or she should touch the screen to effectuate a particular medical function. In general, there may be a plurality of such selection button regions simultaneously designated in different areas of the dynamic display 30, and the dynamic display 30 provides a suitably indicative button, text, or other image to define for the authorized medical person 24 the extent of each selection button region and the function of each selection button region.

Figure 5A:
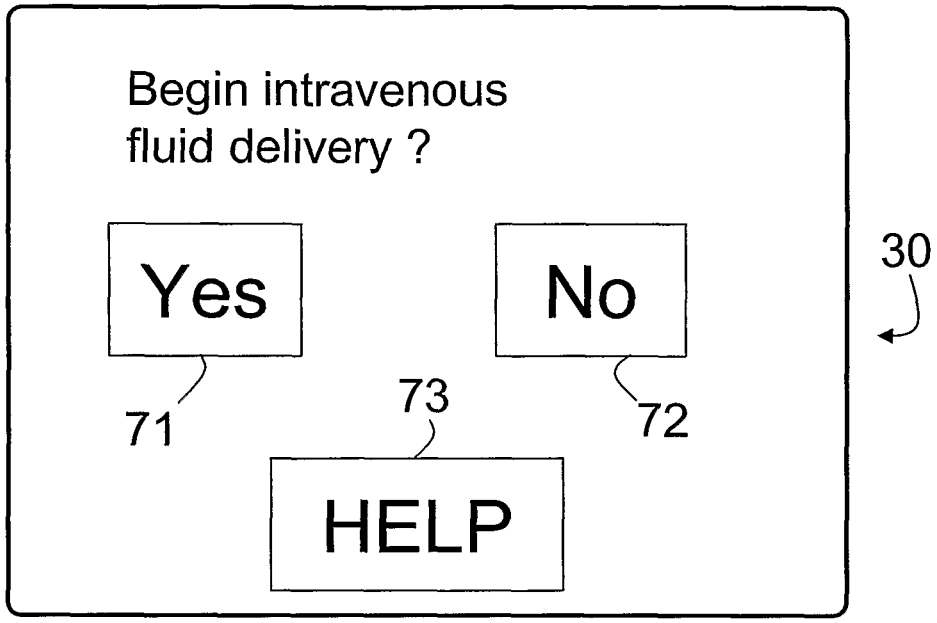
FIGS. 5A and 5B show example displays suitably implemented with any of the user interfaces of FIGS. 2A, 2B and 2C, FIGS. 3A and 3B, or FIG. 4.

For example, in FIG. 5A, the display screen has a heading "Begin intravenous fluid delivery?" and further includes three selection button regions 71, 72, 73. A touch by the authorized medical person 24 in the selection button region 71 selects a corresponding function that starts intravenous fluid delivery, in accordance with the intuitive label "Yes" displayed in the selection button region 71 by the dynamic display 30. Similarly, a touch by the authorized medical person 24 in the selection button region 72 does not start intravenous fluid delivery, in accordance with the intuitive label "No" displayed in the selection button region 72 by the dynamic display 30. A touch by the authorized medical person 24 in the selection button region 73 causes the dynamic display 30 to replace the images shown in FIG. 5A with a help screen, in accordance with the intuitive label "Help" displayed in the selection button region 73 by the dynamic display 30.

Figure 5B:
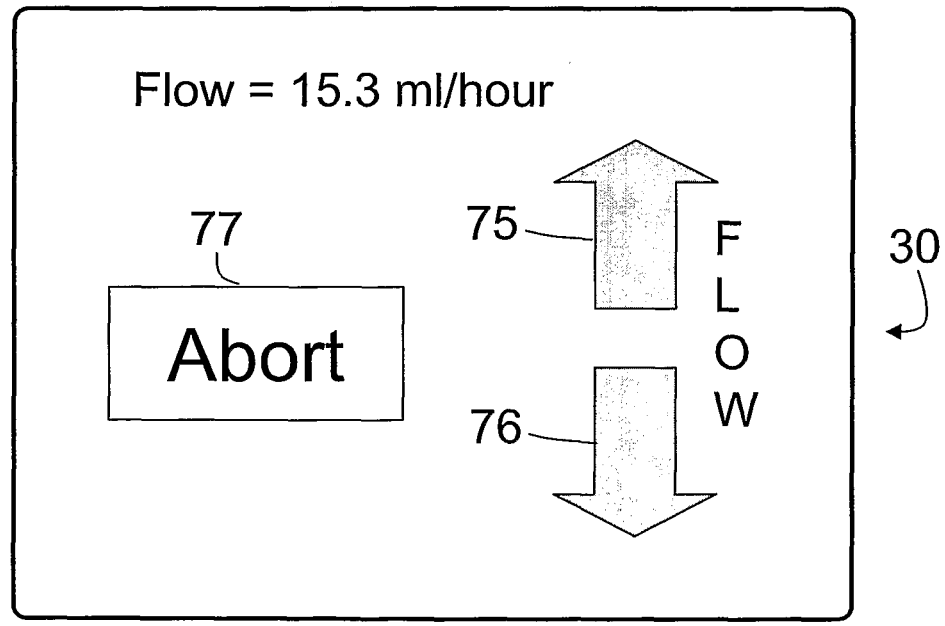

With reference to FIG. 5B, assuming the authorized medical person 24 touches the selection button region 71 thus causing the intravenous delivery to start, the dynamic display 30 updates by replacing the images shown in FIG. 5A with those shown in FIG. 5B. The new display shows the current intravenous flow rate ("Flow=15.3 ml/hour"). Moreover, the previous three selection button regions 71, 72, 73 are no longer defined, and instead new selection button regions 75, 76, 77 are defined. A touch by the authorized medical person 24 in the selection button region 75 selects a corresponding function that increases the rate of the intravenous fluid delivery, in accordance with the intuitive up-arrow displayed in the selection button region 75 by the dynamic display 30. Similarly, a touch by the authorized medical person 24 in the selection button region 76 selects a corresponding function that decreases the rate of the intravenous fluid delivery, in accordance with the intuitive down-arrow displayed in the selection button region 76 by the dynamic display 30. The display 30 also vertically displays the letters "F", "L", "O", "W" parallel to but outside of the selection button regions 75, 76 to further indicate to the authorized medical person 24 the purpose of the selection button regions 75, 76. A touch by the authorized medical person 24 in the selection button region 77 causes the intravenous delivery to be aborted, in accordance with the intuitive textual image label "Abort" displayed in the selection button region 77 by the dynamic display 30.

Because the fingerprint readers 50, 50', 50" can read fingerprints through the dynamic display 30, it is possible to display a selection button region label within each selection button region. Some fingerprint readers, however, such as optical fingerprint scanners, may be unable to operate through the dynamic display 30. Accordingly, when using such fingerprint scanners it is not possible to display text in the selection button region in the moment of the scanning, because the display would interfere with the reading of the fingerprint. In such case, the fingerprint scanning should be made fast enough, so that the user does not realize it or get not disturbed by it.

Figure 6A:
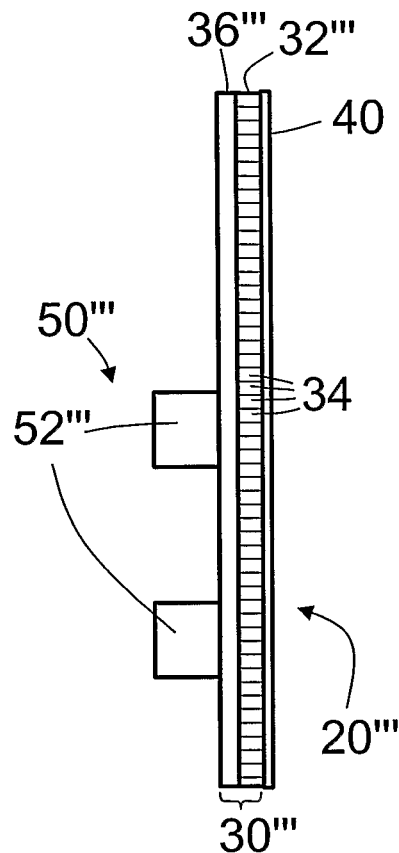
FIG. 6A shows a diagrammatic side view of a user interface including a dynamic display, touchscreen overlay, and a plurality of fixed-position fingerprint scanners.
Figure 6B:
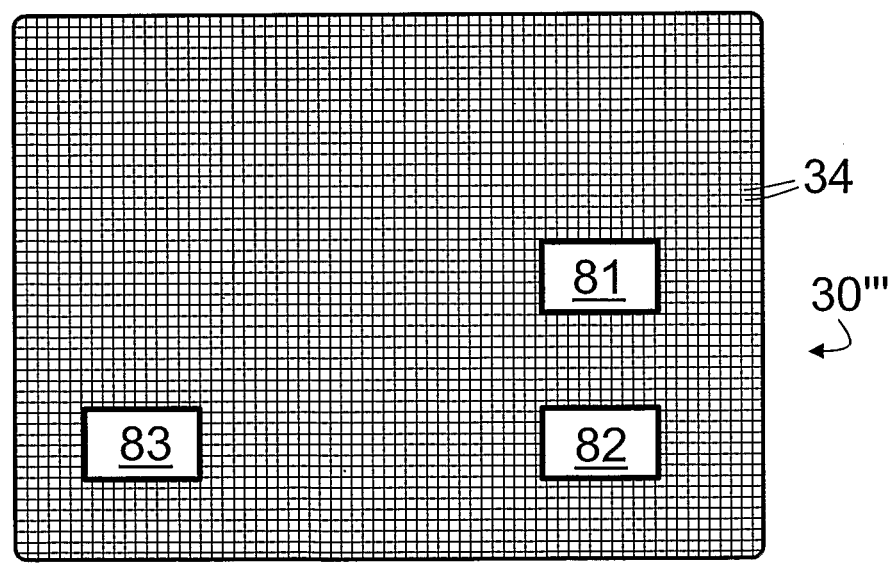
FIG. 6B shows a front view of the user interface of FIG. 6A.

With reference to FIGS. 6A and 6B, still yet another user interface 20''' includes a fingerprint reader 50''' having three fingerprint scanners 52''' (only two of which are visible in the side view of FIG. 6A) arranged at fixed positions relative to a modified dynamic display 30'''. The dynamic display 30''' is modified versus the dynamic display 30 in that the LCD 32''' and backlight 36''' includes three gaps 81, 82, 83 aligned with the fixed positions of the three fingerprint scanners 52'''. The three gaps 81, 82, 83 define three selection button regions whose positions relative to the dynamic display 30''' are fixed at the gaps 81, 82, 83. The fingerprint readers 52''' read through the respective gaps 81, 82, 83. Accordingly, the fingerprint scanners 52''' are operative even if they are of a type which cannot read through the backlight and LCD pixels. The touchscreen overlay 40 extends over the entire display area including the three gaps 81, 82, 83. In a variation, the touchscreen overlay may be limited to covering only the areas of the three gaps 81, 82, 83.

Figure 7A:
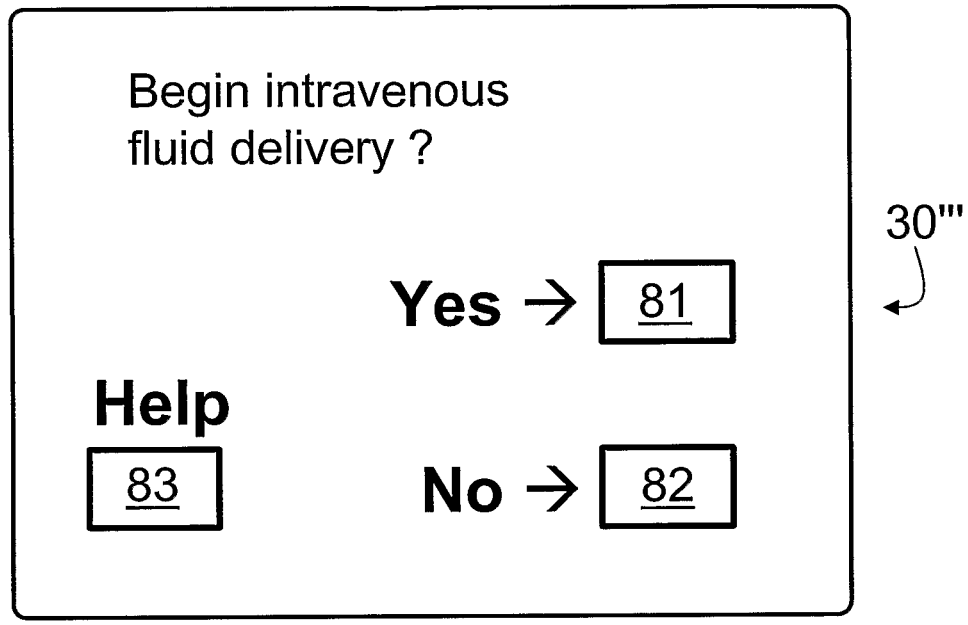
FIGS. 7A and 7B show example displays suitably implemented with the user interface of FIGS. 6A and 6B.
Figure 7B:
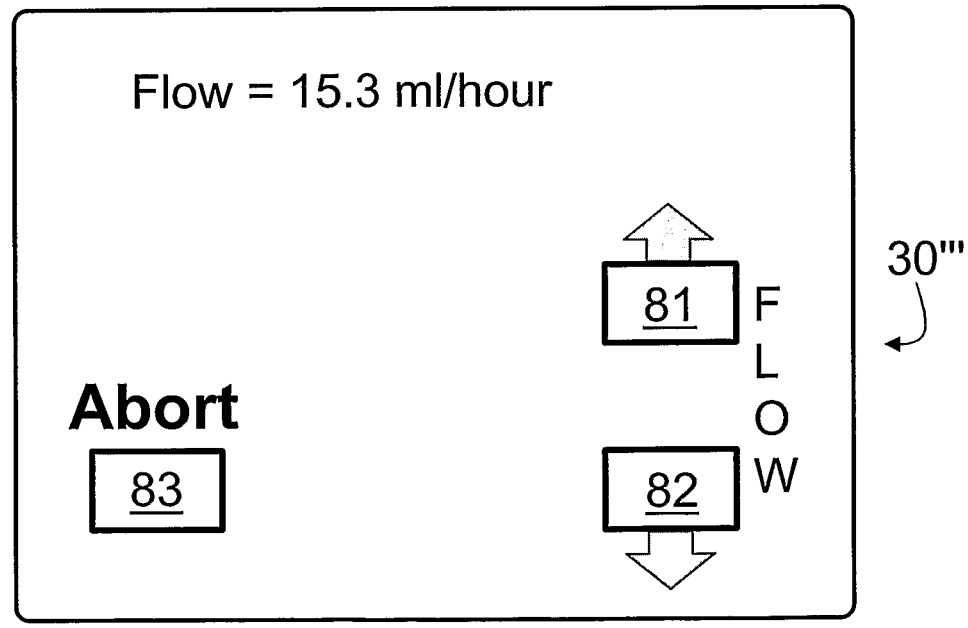

With continuing reference to FIGS. 6A and 6B, and with further reference to FIGS. 7A and 7B, the gaps 81, 82, 83 correspond to three selection button regions. Unlike the selection button regions of FIGS. 5A and 5B, the gaps 81, 82, 83 are not movable, and since the dynamic display 30''' does not extend over the gaps 81, 82, 83 the visual appearance of the gaps 81, 82, 83 is static. Instead, the dynamic display 30''' displays text or graphics adjacent the gaps 81, 82, 83 to indicate to the authorized medical person 24 what function is performed by touching each selection button region defined by the gaps 81, 82, 83. For example, in FIG. 7A, the heading "Begin intravenous fluid delivery?" is displayed as in analogous FIG. 5A. However, in FIG. 7A the gap 81 corresponding to a selection region that starts the intravenous delivery is labeled by a left adjacent image "Yes →". Similarly, the gap 82 corresponding to a selection region that does not start intravenous delivery is labeled by a left adjacent image "No →". Finally, the gap 83 corresponding to a selection region that brings up a help screen is labeled by an above-adjacent image "Help".

With reference to FIG. 7B, assuming the authorized medical person 24 touches at the gap 81 thus causing the intravenous delivery to start, the dynamic display 30''' updates by replacing the images shown in FIG. 7A with those shown in FIG. 7B. The new display shows the current intravenous flow rate ("Flow=15.3 ml/hour") and continues to use the gaps 81, 82, 83 as selection button regions, but with different associated functions and different adjacent labels. Thus, the gap 81 is labeled by an above-adjacent up-arrow indicating a function of increasing flow, while the gap 82 is labeled by a below-adjacent down-arrow indicating a function of decreasing flow. The display 30''' also vertically displays the letters "F", "L", "O", "W" parallel to and outside of the gaps 81, 82 to further indicate to the authorized medical person 24 the purpose of the selection button regions corresponding to the gaps 81, 82. The gap 83 is labeled in FIG. 7B with the textual image "Abort" indicating that the selection button region of gap 83 aborts the intravenous delivery.

The gaps 81, 82, 83 are openings located within the dynamic display 30'''. In other contemplated embodiments, the display does not include openings, and the fingerprint reader acquires fingerprints in selection button regions located outside the area of the dynamic display, for example adjacent a periphery of the dynamic display. In such contemplated embodiments, the dynamic display shows an arrow or other indicator pointing out the selection button region at the display periphery. While the gaps or peripheral selection button regions do not have dynamic display capability, they are preferably molded, painted, inscribed, or otherwise formed to indicate buttons or other intuitive selectors.

Having described several example embodiments of user interfaces 20, 20', 20", 20''' each including a dynamic display 30, 30''', a touchscreen overlay 40, and a fingerprint reader 50, 50', 50", 50''', associated electronic data processing is described, which employs the user interface 20, 20', 20", 20''' to receive a user input via a finger touch and which employs the fingerprint reader 50, 50', 50", 50''' to identify the user.

With reference to FIG. 8, the user interface 20 includes the dynamic display 30, the touchscreen overlay 40, and the fingerprint reader 50. (Although FIG. 8 is described with reference to the example user interface 20, it is to be appreciated that the user interface 20 can be replaced by any of the other example user interfaces 20', 20", 20''', as indicated by parenthetical reference numbers in diagrammatic FIG. 8). The user interface further includes a fingerprint processing module 90 that controls the fingerprint reader 50.

Security software 92 performs authentication based on the fingerprint. Medical software 100 executes one or more selected medical procedures under the control of the authorized medical person 24, and employs the user interface 20 and the security software 92 to provide authenticated interfacing with the authorized medical person 24. In some embodiments, the software 92, 100 executes on a processor integrated with the user interface 20 as a unitary medical device as illustrated in FIG. 1. In other embodiments, the medical software program 100, or both the security and medical software 92, 100, execute on a separately housed processor connected with the user interface 20 by a physical cable, a wireless connection, or the like. The medical software 100 includes a display generator 102 that causes the dynamic display to show a suitable user interfacing screen, such as one of the displays shown in FIG. 5A, 5B, 7A, or 7B. When someone touches the touchscreen overlay 40, it creates an electrical signal that is received by the fingerprinting controller 90 of the user interface 20 and by a function selector 104 of the medical software 101.

At the medical software program 100, the electrical signal caused by the finger touch triggers the function selector 104 to access a functions database 106 to determine which function corresponds to touch location indicated by the touchscreen overlay 40. Typically, the functions database 106 includes screen ranges defining the selection button regions displayed on the dynamic display 30, along with an identification of a function corresponding to each selection button region. For example, given a rectangular selection button region bounded by $x_{min}$ and $x_{max}$ in an x-coordinate direction and by $y_{min}$ and $y_{max}$ in a transverse y-coordinate direction, a touch location (x, y) lies within the rectangular selection button region if the two conditions $X_{min} \leq x \leq x_{max}$ and $y_{min} \leq y \leq y_{max}$ are both satisfied. If so, then a function corresponding to the rectangular selection button region is retrieved from the functions database 106 by the function selector 104.

At the user interface 20, the electrical signal caused by the finger touch triggers the fingerprinting controller 90 to acquire a fingerprint at the touch location. In the case of the fingerprint reader 50 which employs a grid of fingerprint scanners 52, this entails acquiring the fingerprint using the one or more fingerprint scanners 52 that underlie the touch location. In the case of the fingerprint reader 50', the fingerprinting controller 90 causes the mechanical translators 54, 56, 58 to position the fingerprint scanner 52' at the touch location and then causes the fingerprint scanner 52' to acquire the fingerprint. In the case of the fingerprint reader 50", the fingerprinting controller 90 causes the fingerprint scanner 52" to position the probe beam at the touch location and then causes the fingerprint scanner 52" to acquire the fingerprint using the probe beam directed at the touch location. In the case of the fingerprint reader 50''', fingerprinting controller 90 causes the fingerprint scanner 52''' underlying the touch location to acquire the fingerprint. In the case of fingerprint reader 50''', however, it may be that the touch location does not correspond to any of the fixed-position fingerprint scanners 52''', in which case no fingerprint is acquired.

The acquired fingerprint (if any) is first cryptographically hashed by a cryptographic hashing module 94 and stored in a hashed fingerprint memory 108. An authenticator 110 accesses a fingerprint database 112 attempting to identify the hashed fingerprint. The fingerprint database 112 contains a set of hashed user fingerprints and their corresponding unique alphanumeric code identifiers. The contents of the fingerprint database have been previously filled by secure means and should be kept, used and maintained securely. Note that the fingerprint database may reside in the medical device or may be accessed remotely and securely by the medical device. Typically, the hashed fingerprint is a an alphanumeric code, and the authenticator 110 compares the acquired hashed fingerprint with corresponding fingerprint hashes stored in the fingerprint database 112 in attempting to make the identification. If the person who touched the screen is an authorized user such as the authorized medical person 24, then a representation of the authorized person's fingerprint hash exists in the fingerprint database 112 and so a match will be found. The authenticator outputs the unique identifier of the user, which consists in another alphanumeric code. On the other hand, if the person who touched the screen is an unauthorized user, such as the orderly 26, then the fingerprint will not be in the database and so no match will be found.

An access controller 114 of the security software 92 determines whether the person who touched the screen is an authorized user. In some embodiments, this determination is made based solely on whether the authenticator 110 successfully matches the acquired hashed fingerprint with a hashed fingerprint in the fingerprint database 112. This approach is straightforward, but does not provide for users having different authorization levels or characteristics. For example, considering the screen of FIG. 5B, it may be desirable to allow only a physician to change the intravenous fluid flow (since this amounts to a change in the patient's prescription) but to allow a nurse to activate the abort button to stop intravenous fluid delivery in the event of an emergency.

To accommodate such differing levels of authorization, a function executer 120 asks for permission to execute the selected function. The access controller 114 references an access rights database 116 that includes an authorization class for each user unique identifier and authorization information for each function indicating which authorization class or classes are allowed to invoke that function. The access controller 114 references the access rights database 116 to check whether the authenticated user has access rights to the selected function. If access rights are identified, the access controller 114 informs the function executor 120 that the selected function may be executed. In this way, for example, the flow selection button regions 75, 76 of FIG. 5B can be associated with flow adjustment functions whose authorization information is limited to the authorized physician class; whereas the abort selection button region 77 of FIG. 5B is associated with an abort function whose authorization information allows a person of any authorization class to activate the abort function.

Conditional upon the access controller 114 identifying the user unique identifier with an authorized user who is authorized to invoke the function, the function executer 120 performs the function selected by the touch location. On the other hand, if the acquired hashed fingerprint is unidentified or corresponds to a user who is not authorized to perform the selected function, then the touch is ignored and optionally a pop-up message informs the user that he/she has no access rights for executing that function.

Optionally, a log file 122 maintains a record of each executed function along with an identification based on the fingerprint authentication of the authorized user who caused the function to be executed. In some embodiments, only the unique user identifier of the authorized user together with the executed function identifier is stored in the log file 122. In other embodiments, the acquired cryptographic hashed fingerprint is stored in the log file 122 cryptographically bound to the executed function identifier and optionally the time of execution and some other log information, so that it can be used as evidence in the event that there is later a question about who invoked the function.

To ensure reliable operation, the fingerprint acquisition should be faster than a typical contact time of a finger touch on the touchscreen overlay 40. A typical contact time ($\tau$) of the finger on the touchscreen is about $\tau \cong 100$ milliseconds. Thus, the touchscreen overlay 40 should identify the touch location and the fingerprint reader 50, 50', 50", 50''' should acquire the fingerprint at the touch location, all within less than about 100 milliseconds. The touchscreen overlay 40 typically operates electrically using analog resistive, capacitive, or surface acoustical wave (SAW) technology. Such electrical operation is much faster than the fingerprint acquisition; hence, it is generally sufficient for reliable operation to ensure that the fingerprint acquisition time is less than the typical contact time $\tau$. One sufficiently fast fingerprint reader is the FingerCheck FC-100 (available from Startek Engineering Inc., Hsinchu, Taiwan, R.O.C.), which can acquire a fingerprint in about 33 milliseconds. Mechanically translated and electrically steered fingerprint readers such as the fingerprint readers 50', 50" can have acquisition times, including the positioning, of less than about 50 milliseconds.

Another aspect of reliable operation is resolution for screen touches occurring in rapid succession. For a fingerprint acquisition time of less than the typical contact time $\tau \sim 100$ milliseconds, a single user is unlikely to make successive touches in less than the fingerprint acquisition time due to the delay involved in moving the finger from one screen position to another. For a clinical team of four persons, assuming a screen touch rate of one touch per second for each person, a maximum rate of about four screen touches per second can be expected. Assuming a 33 millisecond fingerprint acquisition time, the probability that two clinicians touch the screen in less than a 33 millisecond interval is estimated to be less than about 1%, providing high reliability in a multiple-user environment.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A user interface for providing user identification and authentication of users accessing to medical equipment, data, or records, the user interface comprising:
   a dynamic display comprising a two-dimensional arrangement of pixels and selectively showing user options;
   a touchscreen overlay aligned with the dynamic display and disposed over a front of the dynamic display to identify a touch location on the front of the dynamic display; and
   a fingerprint reader disposed behind the dynamic display, the fingerprint reader triggered by the touchscreen overlay to acquire a fingerprint at the touch location on the front of the dynamic display.

2. The user interface as set forth in claim 1, wherein the fingerprint reader acquires the fingerprint within 100 milliseconds of being triggered by the touchscreen overlay.

3. The user interface as set forth in claim 1, wherein the dynamic display is selected from a group consisting of: (i) a liquid crystal display and (ii) a plasma display.

4. The user interface as set forth in claim 1, further including:
   a function selector identifying a function to be performed based on the touch location on the front of the dynamic display.

5. The user interface as set forth in claim 4, wherein the function selector identifies the function based upon the touch location on the front of the dynamic display lying in a selection button region associated with the function.

6. The user interface as set forth in claim 5, wherein the dynamic display generates a selection button image in the selection button region indicating the associated function.

7. The user interface as set forth in claim 4, further including:
   a fingerprint database containing fingerprints of authorized users;
   a fingerprint authenticator that matches the acquired fingerprint with a fingerprint contained in the fingerprint database; and
   an access controller indicating authorization conditional at least upon the fingerprint authenticator matching the acquired fingerprint with a fingerprint of an authorized user contained in the fingerprint database.

8. The user interface as set forth in claim 7, further including:
   a function executer that performs the function conditional upon the access controller indicating authorization.

9. The user interface as set forth in claim 8, further including:
   a memory in which a record of the authorized user who authorized the performance of each executed function is stored.

10. The user interface as set forth in claim 4, further including:
    a fingerprint database containing fingerprints of authorized users, each authorized user further being associated with an authorization class;
    a fingerprint authenticator that matches the acquired fingerprint with a fingerprint contained in the fingerprint database; and
    an access controller indicating authorization conditional upon (i) the fingerprint authenticator matching the acquired fingerprint with a fingerprint of an authorized user contained in the database, and (ii) the authorization class of the matched authorized user comporting with an authorization class of the identified function, the function being performed conditional upon the access controller indicating authorization.

11. The user interface as set forth in claim 1, wherein the fingerprint reader includes:

a plurality fingerprint scanners, each fingerprint scanner arranged to acquire at least a portion of a fingerprint in a designated selection button region on the dynamic display.

12. The user interface as set forth in claim 11, wherein the plurality of fingerprint scanners define a two-dimensional array substantially spanning the area of the dynamic display.

13. The user interface as set forth in claim 1, wherein the fingerprint reader includes:
   a fingerprint scanner; and
   a mechanical translator that moves the fingerprint scanner under the touch location prior to acquiring of the fingerprint at the touch location.

14. The user interface as set forth in claim 1, wherein the fingerprint reader includes:
   a steerable ultrasonic fingerprint scanner that aligns an ultrasonic probe beam under the touch location on the front of the dynamic display during the acquiring of the fingerprint at the touch location on the front of the dynamic display.

15. An apparatus comprising:
   a user interface configured to provide identification and authentication of a user performing an operation via the user interface, the user interface including a thin-screen display comprising a two-dimensional arrangement of pixels configured to display a selection input via which a user selects to perform the operation, a touchscreen overlay disposed over a front of the thin-screen display and configured to identify a user touching the thin-screen display at a touch location effective to activate the selection input, and a fingerprint reader disposed behind the thin-screen display and configured to acquire a fingerprint at the touch location on the front of the thin-screen display;
   a fingerprint authenticator configured to match the acquired fingerprint with a fingerprint contained in a fingerprint database; and
   an access controller configured to authorize performing the operation conditional upon the fingerprint authenticator matching the acquired fingerprint with a user who is authorized to perform the operation.

16. The apparatus of claim 15, wherein the fingerprint reader comprises an ultrasonic fingerprint scanner.

17. The apparatus of claim 16, wherein the ultrasonic fingerprint scanner is mounted in a fixed position behind the thin-screen display and includes an electrically steerable ultrasonic transducer head that aligns an ultrasonic probe beam with the touch location to acquire the fingerprint at the touch location on the front of the thin-screen display.

18. A user interface comprising:
   a dynamic display comprising a two-dimensional arrangement of pixels and selectively showing user options;
   a touchscreen overlay aligned with the dynamic display and disposed over a front of the dynamic display to identify a touch screen input comprising a touch location on the dynamic display; and
   a fingerprint reader disposed behind the dynamic display, the fingerprint reader configured to acquire a fingerprint at the touch location on the front of the dynamic display.

* * * * *